Jan. 10, 1939.  R. H. PLASS  2,143,422
DEHAIRING OF PELTS
Filed Sept. 27, 1934  3 Sheets-Sheet 1
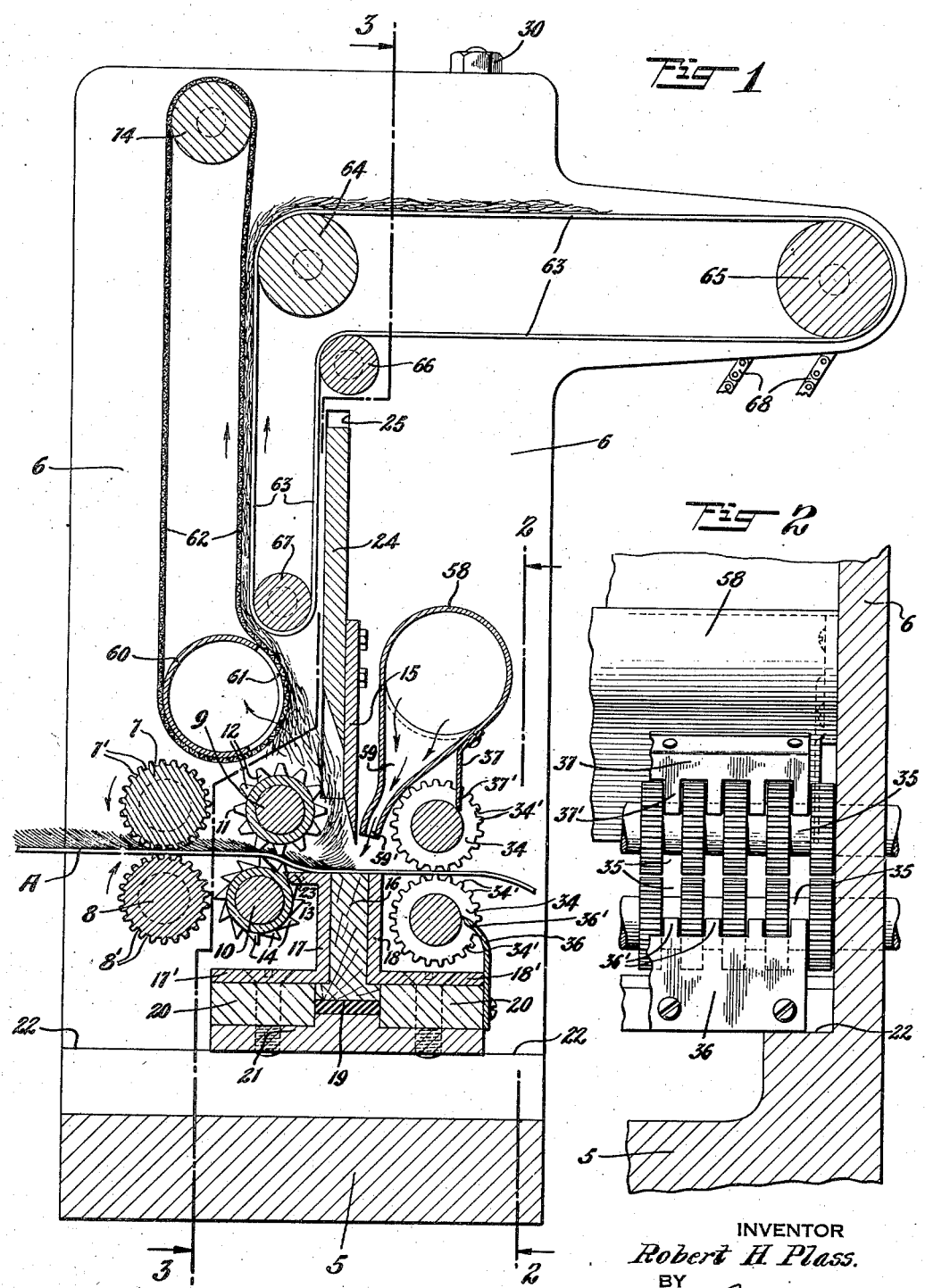
INVENTOR
Robert H. Plass.
BY
E. C. Sanborn
ATTORNEY

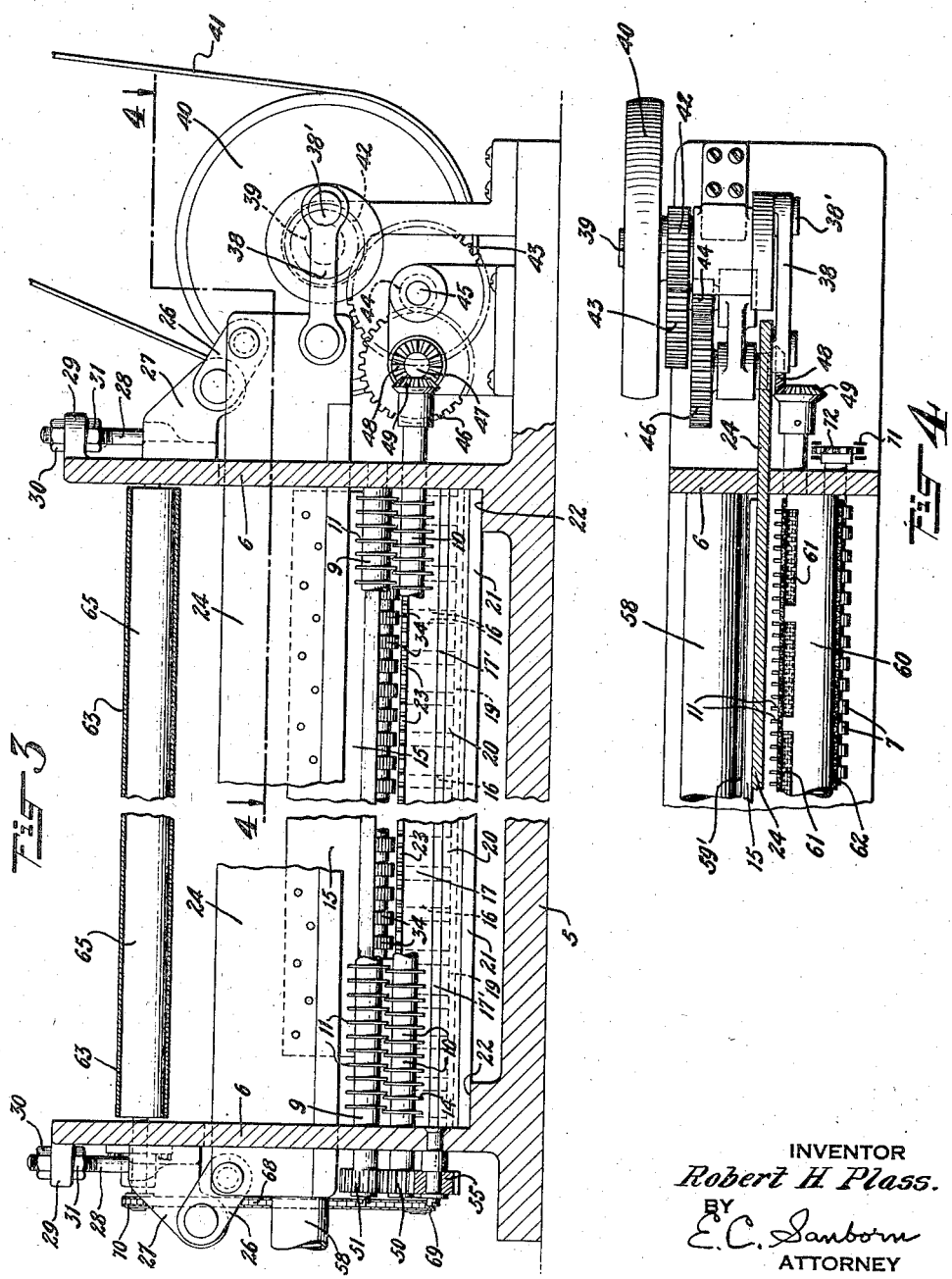

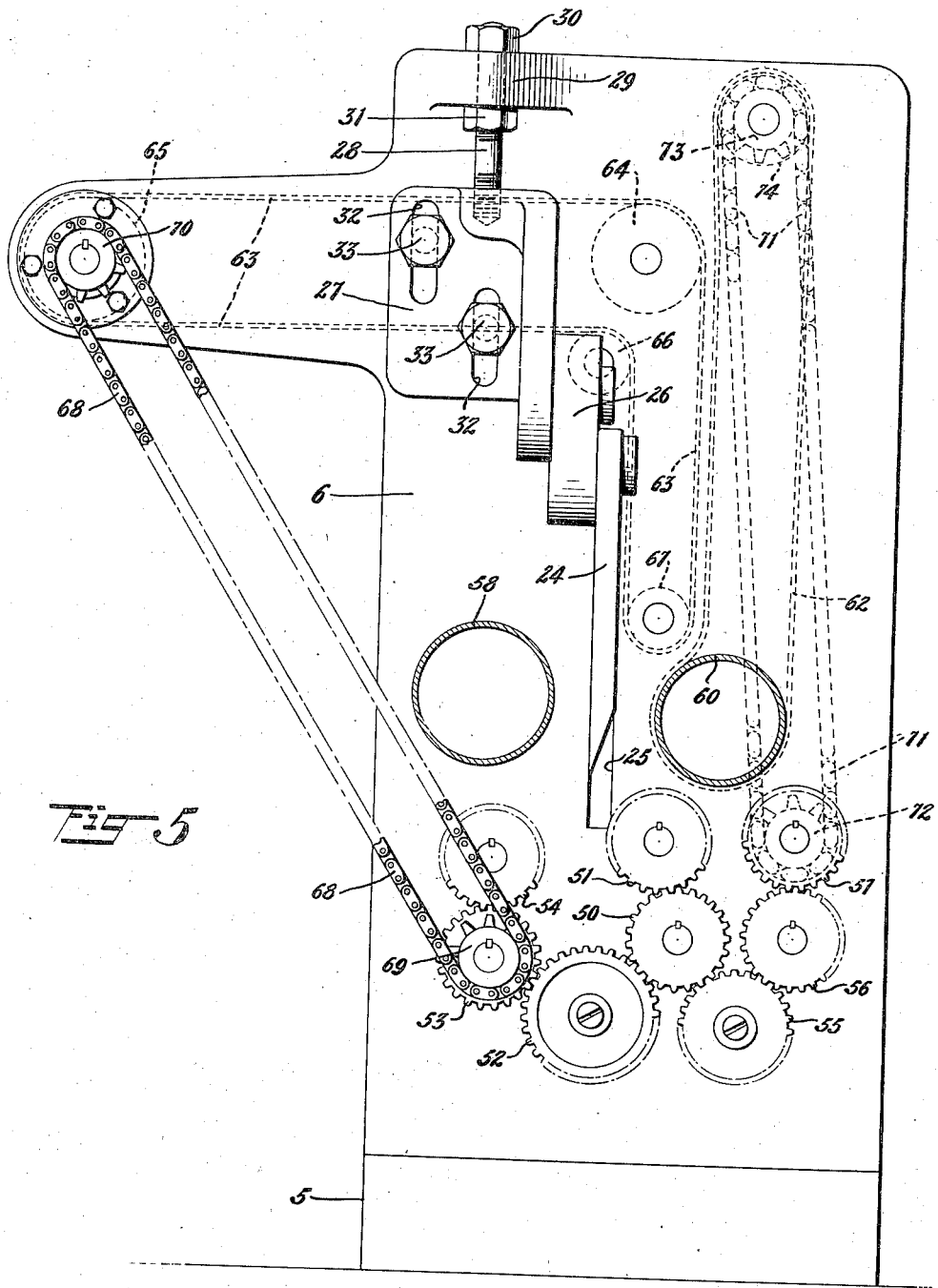

Patented Jan. 10, 1939

2,143,422

UNITED STATES PATENT OFFICE 2,143,422

DEHAIRING OF PELTS

Robert H. Plass, Upper Montclair, N. J.

Application September 27, 1934, Serial No. 745,656

34 Claims. (Cl. 19—2)

This invention relates to the dehairing of animal pelts or skins to produce fur useful, for example, in the manufacture of hats. A prime object of the invention is to accomplish the removal of hair or fur from pelts or skins in a novel and highly efficient manner, involving a minimum of waste. The invention provides in this connection a novel pelt dehairing method, together with novel apparatus for carrying out said method, whereby the loss of fur occasioned by prior practice is substantially reduced. An important feature of the invention resides in the provision of air blast means in such relation to the cutting mechanism as to remove the severed fur promptly and thoroughly from the cutting station, thereby avoiding repeated cutting of the ends of the severed fur, and with consequent marked reduction of undesirable wastage. The invention further provides for the practicable and effective dehairing of pelts without the necessity of cutting the same into pieces or slivers. A further feature of the invention resides in the provision of means at the rear of the cutting mechanism for positively and automatically drawing the pelts through the cutting apparatus, rendering unnecessary the provision of special means such as heretofore employed for advancing the final portion of the pelt to the cutting means. In addition, the invention provides new and improved pelt feeding and discharge means, as well as a novel and efficient cutting mechanism. Other features of the invention will be hereinafter described and claimed.

In the accompanying drawings:

Figure 1 is a vertical sectional view of a fur cutting machine embodying the principles of my invention.

Figure 2 is a vertical sectional view on line 2—2 of Figure 1.

Figure 3 is a vertical sectional view on line 3—3 of Figure 1, certain parts being broken away.

Figure 4 is a horizontal sectional view on line 4—4 of Figure 3.

Figure 5 is a view in end elevation.

Referring to the drawings, the reference numeral 5 indicates the base portion and 6 the side members of a frame-work upon which the mechanism of the machine is mounted. Journaled in said side members are an upper feed roller 7 and a lower feed roller 8, between which the pelt A is placed. Said rollers are shown solid in structure but longitudinally corrugated or fluted as indicated at 7', 8', respectively, to provide projections on their periphery for improving their grip upon the pelt and thus expediting the feeding of the latter. Also journaled in the frame members 6 to the rear of the rollers 7, 8, is a pair of rollers 9, 10. The upper roller 9 is composed of a series of circular blades 11 each of which blades has projecting around its periphery a series of teeth 12 with flat ends; while the lower roller 10 similarly comprises a set of circular blades 13, the peripheral teeth 14 of each blade 13, however, being of inclined or saw-tooth shape.

From the rollers 9, 10, the pelt passes into the range of action of the knife 15, which is positioned transversely to the line of travel of the pelt and is also arranged to cut into the pelt sufficiently to sever the fur therefrom, without, however, cutting entirely through the pelt. Below said knife is a cutting bed so constructed as to be yieldable along the line of the cut, so that regardless of substantial variations in thickness of the pelt the latter is pressed evenly against the edge of the knife along the entire length thereof. This cutting bed may comprise a series of blocks 16 which are mounted between guide members 17, 18, and rest at their lower ends upon an element 19 of rubber or other suitable resilient material. Each of the blocks 16 is shown as in the shape of an inverted T the horizontal lower end of each block extending under the bottom surfaces of the guide members 17, 18, as shown in Figure 1. The guide members aforesaid are each fitted between the side elements 6, 6 of the framework and comprise lower horizontally extending flanges 17', 18', respectively, which rest upon supporting bars 20, 20. The latter are mounted on a plate 21 mounted at its ends upon ledges 22, 22 on the frame-work. The members 17, 18 may be secured to the respective bars 20, 20 and to the plate 21 in any convenient manner as by bolts.

Extending into the spaces between the respective sets of teeth on the blades 13 are stripper teeth or projections 23, which may be conveniently formed on the upper end portion of the guide member 17. It will be noted that the pelt A is positioned with its fur or hair side upwardly and its opposite side in engagement with lower rollers 8 and 10. The lower side of the pelt is likely to be greasy, and the saw teeth 14 of roller 10 in cooperation with the stripper teeth 23 prevent the skins or pelts from sticking and passing around said roller, said saw teeth 14 also precluding the pelt from sliding sidewise under the lateral sweep of the knife 15 hereinafter described.

The knife 15 is secured to the knife carrier 24, which is slidably mounted in slots 25 in the side members 6 and is suspended by links 26 from brackets 27 on said side members. The brackets 27 may, if desired, be adjustably mounted upon said side members, as by bolts 28, as will be readily understood. As shown more clearly in Figure 3, for example, each bolt 28 may be threaded at its lower end into the associated bracket 27 and may pass through a ledge 29 on the associated side member 6; which ledge may be engaged on its top and bottom sides by nuts 30, 31, respectively, on said bolt. Each bracket may also be provided with slots 32, 32 through which pass bolts 33, 33 into the associated member 6. The brackets aforesaid, may thus be accurately adjusted to bring the knife 15 into any desired relation to the pelt for cutting thereinto to any desired extent.

Journaled in the side members 6, 6 rearwardly of the knife 15 is a pair of pelt delivery or discharge rollers 34, 34, which are solid but grooved circumferentially as indicated at 35. The portions of said rollers between the grooves are corrugated or fluted longitudinally to provide projections 34' for gripping the pelt. A comb member 36, attached to one of the support bars 20, has stripper fingers 36' which enter into the grooves 35 in the lower roller 34; while a similar comb member 37 is provided with stripper fingers 37' entering the grooves 35 in the upper roller. The stripper fingers aforesaid prevent the pelts from becoming wrapped around said rollers. It will be understood that each of the feed rollers 7, 9, and the upper roller 34, may, if desired, be yieldably mounted under spring pressure so as to be able to rise a slight distance; such mounting being well known in the art and shown, for example, in my Patent No. 1,842,566, dated Jan. 26, 1932.

The various feed rollers and the knife 15 may be operated from a common source of power. To this end the knife holder 24 is shown connected by a link 38 with a crank pin 38' on shaft 39 driven by pulley 40 through belt 41 from a suitable power source; whereby the knife 15 is actuated to sweep rapidly across the pelt in alternately opposite directions during the operation of the feed mechanism. The latter is actuated concurrently with the knife, but at reduced speed, for which purpose the roller 10 is driven continuously from shaft 39 through reduction gearing comprising gear 42 on said shaft, gears 43 and 44 on shaft 45, and gear 46 on shaft 47, the latter shaft having a bevel gear 48 thereon meshing with bevel gear 49 on the roller 10. A gear 50 on the opposite end of roller 10 meshes with gear 51 on roller 9, thereby driving the latter. An idler gear 52 meshes with gear 50 and with gear 53 on the lower roller 34 whereby the latter is driven from roller 10 in the same direction as the latter, and at the same time the upper roller 34 is driven in the same direction as roller 9 through gear 54 which meshes with gear 53. An idler gear 55 meshing with gear 50 drives the lower roller 8, through gear 56, in the same direction as roller 10; and the roller 7, through gear 57 which meshes with gear 56, is at the same time driven in the same direction as roller 9. The gearing between the shaft 39 and the feed rollers is such as to cause feeding of the pelt a slight distance between successive sweeps of the knife 15. A feed of one thirty-second of an inch between successive cuts has been found satisfactory in practice though this distance may of course be varied as desired.

Immediately to the rear of the knife 15 I provide a positive air blast means which may comprise a pneumatic conveyor pipe 58 mounted on the machine frame and connected to a suitable blower (not shown). From the pipe 58 there extends an air discharge conduit 59, which narrows at its outer end to provide an outlet 59' of restricted area extending across the width of the pelt and adjacent the line of action of the knife 15. The outer end portion of the conduit 59 extends, as shown, in such direction as to cause the air issuing therefrom to sweep across the line of cut of the knife 15 and thereby to remove the severed layer of fur out of reach of the next cut. In this way the knife may cut across the pelt with extreme rapidity along successive closely-spaced lines and as soon as fur is severed along one line it is removed from the path of action of the knife so that cutting of the fur which has been severed from the pelt is avoided. A substantial saving of fur is thus obtained and at the same time the machine may operate with the utmost speed in the dehairing or defurring of the pelts.

Forwardly of the knife 15 and above the rollers 7, 9, there is positioned a suction pipe 60, having an opening at 61 through which air is drawn in response to the suction in said pipe, the latter being connected to any suitable suction source (not shown). The fur blown away from the knife 15 by the blast emerging from the conduit 59 is sucked upwardly to the pipe 60 for disposal. Said fur may be sucked into said pipe through the opening 61 and thence carried through said pipe for collection, or may, as shown, be carried by said suction onto an endless conveyor screen or belt 62 of air pervious material. A belt 63 is arranged adjacent the belt 62 and cooperates therewith to assist in elevating the fur deposited thereon, said fur being engaged between both belts during its upward travel with belt 62, as shown in Figure 1, and thence continuing upwardly with both belts until, in the region of the roller 64 said fur travels horizontally along the upper run of the belt 63 to a point of disposal beyond the roller 65. With the foregoing construction the fur cut from the pelts and deposited on the belt 62 is compressed between the belts 62, 63 into a continuous fleece which is delivered to the disposal point.

The belt 63 is engaged with rollers 64, 65, 66, and 67 and may be driven in any convenient way; as, for example, by a chain 68 (Figure 5) extending from a sprocket wheel 69 on lower roller 34 to a sprocket wheel 70 on roller 65. Similarly, the belt or screen 62 may be driven by a chain 71 extending from sprocket wheel 72 on roller 7 to sprocket wheel 73 on roller 74 around which said belt 62 passes. The belts 62, 63 are thus driven continuously with the pelt feed rollers and the knife 15.

Upon the departure of the pelt from the feed rollers 9, 10 the latter play no further part in the feeding of the pelt, but the travel of the latter over the cutting bed 16 and past the knife 15 is continued by the rollers 34, 34, which draw the pelt positively over said cutting bed and finally discharge it from the machine.

The comb 37 may, as shown, be conveniently secured to the air blast conduit 58.

The operation of the apparatus illustrative of my invention will be apparent from the foregoing description. Briefly summarizing, the operator feeds the pelts in succession to the rollers 7, 8; and as each pelt is engaged by said rollers it is fed to the rear of the machine, first engaging the feed rollers 9, 10, and then passing between the knife 15 and cutting bed 16 and thence to the discharge rollers 34, 34. The rapidly reciprocating knife sweeps across the pelt in alternatively opposite directions, each sweep of said knife cutting across the pelt along a line spaced slightly from that of the succeeding sweep, and severing the adjacent hair or fur filaments close to the bases or roots thereof. The hair or fur severed at each sweep is promptly removed from the range of the knife 15 by the air blast from the conduit 59 and thence is drawn onto the screen 62 by the suction in conduit 60 (or directly into said conduit if the said screen is omitted). The air blast from conduit 59 not only removes the severed hair immediately from the line of action of the knife 15 but furthermore has the effect of laying back the unsevered hair or fur into more nearly horizontal position as the latter comes into the range of the knife, thus facilitating the dehairing action. The resiliently supported blocks 16 of the cutting bed maintain the pelt in even engagement with the knife along the line of the cut despite substantial variation in thickness of the pelt with consequent evenness of cutting. The final portion of the pelt, upon emerging from the rollers 9, 10, is drawn positively over the cutting bed and under the knife 15 by the rollers 34, 34, which finally discharge the dehaired pelt from the machine. When the belts 62, 63 are employed the severed hair or fur is transported to the point of disposal in the form of a continuous sheet or batting.

It may be noted that the air blast from the conduit 59, in addition to removing the severed hair immediately after each cut, also acts to hold downwardly the end of the pelt which first emerges from the rollers 9, 10. When the first part of the pelt is fed through said rollers, it has a tendency to rise owing to the effect of the suction from the pipe 60 and to the action of the knife 15. The downward blast of air from the conduit 59, however, insures that the pelt is held down against the blocks 16 and prevents it from wrapping around the roller 9 and thereby choking the apparatus. When said initial part of the pelt is gripped by the rollers 34, 34, the tendency to become wrapped around the roller 9 is terminated, but during the period preceding the entry of said part into said rollers 34 the downward force of the air blast assures against any choking of the machine by wrapping of the pelt around the roller 9.

The speed of the rollers 7 and 8 is preferably slower than that of the rollers 9 and 10 so as to produce a pull or tension upon the part of the pelt between the respective sets of these rollers, with consequent removal of wrinkles from the pelt.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. The method of dehairing pelts which comprises feeding the pelts past a cutting station, severing fur from said pelts at said cutting station by cutting partially into the body of the pelt, directing an air blast onto the pelts adjacent the cutting station to blow the severed fur away from said station, and collecting the severed fur.

2. The method of dehairing pelts which comprises feeding the pelts past a cutting station, severing fur from each pelt at said cutting station by cutting partially into the body of the pelt along each of a series of successive lines during the travel of said pelt past said station, directing an air blast onto the pelt adjacent the cutting station to blow the severed fur away from said station, and collecting the severed fur.

3. The method of dehairing pelts which comprises feeding the pelts along a given path, severing fur from each pelt at a cutting station in said path by cutting the pelt along successive closely spaced lines during the travel thereof, and directing an air blast upon each pelt adjacent the cutting station from a fixed source rearwardly thereof and completely widthwise of the pelt to blow the severed fur away from said station.

4. The method of dehairing pelts which comprises continuously feeding the pelts along a given rectilinear path, and severing fur from each pelt at a station in said path by cutting partially into said pelt along each of a series of closely spaced lines transverse to said path during the travel of said pelt.

5. The method of dehairing pelts which comprises feeding the pelts along a given path, severing fur from each pelt at a station in said path by cutting partially into said pelt along each of a series of closely spaced lines transverse to said path during the travel of said pelt, and blowing the severed fur away from said station after each cut.

6. In apparatus for cutting fur from pelts, means for feeding the pelts in a given path, cutting means positioned adjacent said path and adapted to cut partially into the body of each pelt to sever fur therefrom, and air blast means adjacent said cutting means for blowing the severed fur away from said cutting means immediately upon severing of said fur from said pelt.

7. In apparatus for cutting fur from pelts, means for feeding the pelts in a given path, means adjacent the path of travel of the pelts for cutting partially into the body of each pelt along each of a series of successive lines transverse to the direction of travel of said pelt, means for directing an air blast onto the pelt adjacent said cutting means in a direction opposed to the direction of feeding of said pelts to blow the severed fur away from said cutting means and means for collecting the severed fur.

8. In apparatus for cutting fur from pelts, means for feeding the pelts in a given path, means for severing fur from each pelt along successive lines transverse to the direction of travel of the pelt, and means rearward of said severing means for continuously directing an air blast upon the pelt adjacent the cutting means and completely widthwise of the pelt to remove the severed fur from the path of said cutting means.

9. In apparatus for cutting fur from pelts, means for feeding the pelts along a given path, means for severing fur from each pelt, and means for causing said severing means to sweep across said pelt in alternately opposite directions and with each sweep to cut partially into said pelt during the travel of said pelt.

10. In apparatus for cutting fur from pelts, means for feeding the pelts along a given path, means to the rear of said feeding means for severing fur from each pelt, and means on the other side of said severing means from said feeding means for directing a current of air upon said pelt to remove severed fur from the path of said severing means.

11. In apparatus for cutting fur from pelts, means for feeding pelts along a given path, cutting means adjacent said path, means supporting said cutting means for movement about a plurality of spaced pivots, and means for causing said cutting means to move simultaneously about said pivots through positions parallel to each other in each of opposite directions alternately and across the path of travel of said pelts.

12. In apparatus for cutting fur from pelts, means for feeding pelts along a given path, cutting means adjacent said path, a pair of links pivotally connected to said cutting means, supporting means pivotally connected to said links and means for swinging said cutting means and links through an arcuate path first in one direction and then in the other with respect to said supporting means and across the path of said pelts.

13. In apparatus for cutting fur from pelts, means for feeding pelts along a given path, a cutting element pivotally supported for swinging movement across said path, in positions parallel to each other, and means for causing said element to swing across said path in opposite directions alternately.

14. In apparatus for cutting fur from pelts, means for feeding pelts along a given path, reciprocating cutting means for severing fur from each pelt, and means for directing an air blast adjacent said cutting means in a direction opposite to the travel of said pelt for removing severed fur immediately from the range of action of said cutting means.

15. In apparatus for cutting fur from pelts, reciprocating cutting means for severing fur from each pelt, means forward of said cutting means for feeding pelts to said cutting means, and means rearward of said cutting means and separate therefrom for directing an air blast upon each pelt in a direction opposite to the travel thereof, to remove severed fur immediately from the range of action of said cutting means.

16. In apparatus for cutting fur from pelts, cutting means for severing said fur from said pelts, and means comprising a roller having sharp saw-shaped teeth on its periphery contacting the skin side of the pelt and an opposing roller having relatively blunt teeth for feeding the pelts to said cutting means.

17. In apparatus for cutting fur from pelts, fur severing means, pelt feeding means comprising a pair of rollers forwardly of said severing means and a feeding roller having saw-shaped teeth between said severing means and the first mentioned rollers.

18. In apparatus for cutting fur from pelts, fur severing means, means for feeding pelts to said severing means and discharging pelts from which the fur has been severed, the second mentioned means comprising a roller, and stripper means cooperating with said roller for preventing wrapping of the pelt therearound.

19. In apparatus for cutting fur from pelts, fur severing means, means for feeding pelts to said severing means, means comprising a roller having circumferentially grooved portions for discharging pelts from which the fur has been severed, and means comprising elements projecting into the grooved portions of said roller for guiding said pelt.

20. In apparatus for cutting fur from pelts, fur severing means, means comprising a roller for causing movement of the pelts with respect to said severing means, said roller having circumferentially grooved portions, and means comprising elements projecting into said grooved portions for preventing wrapping of said pelts around said roller.

21. In apparatus for cutting fur from pelts, means for feeding said pelts, means for severing fur from each pelt, fixed air blast means separate from said severing means for removing severed fur immediately from the range of action of said severing means, and suction means for collecting the severed fur.

22. In apparatus for cutting fur from pelts, means for feeding said pelts, means for severing fur from each pelt, air blast means separate from said severing means and disposed on one side thereof for removing fur immediately from the range of action of said severing means, an air-pervious conveyor disposed on the other side of said severing means, and suction means for drawing the severed fur onto said conveyor.

23. In apparatus for cutting fur from pelts, fur severing means comprising a knife element and means for moving said knife transversely across the pelt, and roller means for feeding the pelt along a path transverse to the path of said knife, said roller means comprising axially spaced projections preventing the pelt from sidewise movement with respect to its path of travel under the action of said knife.

24. In apparatus for cutting fur from pelts, roller means for feeding pelts along a given path, means rearward of said feeding means for severing fur from said pelt, and means for causing said severing means to cut partially into said pelt along each of a series of successive lines transverse to the direction of feeding for severing said fur, said roller means comprising axially spaced projections for preventing sidewise movement of said pelt under the action of said severing means.

25. In apparatus for cutting fur from pelts, a plurality of sets of rollers for feeding said pelts along a given path, the speed of one of said sets of rollers being slower than that of the other set for placing the pelt under tension and removing wrinkles therefrom and means adjacent said sets of rollers for severing fur from said pelts.

26. In apparatus for cutting fur from pelts, roller means for feeding pelts along a given path, means adjacent said roller means for severing fur from said pelt as it travels along said path, and air blast means for directing a downward blast of air upon said pelt as the latter emerges from said roller means to hold the pelt in place for the cutting operation and to prevent wrapping of said pelt about said roller means.

27. The method of dehairing pelts which comprises feeding the pelts along a given path, and severing fur from each pelt by causing a cutting instrumentality to sweep toward the pelt and across the same and to cut partially into the pelt.

28. The method of dehairing pelts which comprises feeding the pelts along a given path and severing fur from each pelt by causing a cutting instrumentality to sweep toward the pelt and across the same and to cut partially into the pelt, meanwhile yieldingly supporting the portion of said pelt directly opposite said cutting instrumentality.

29. In apparatus for cutting fur from pelts, means for feeding pelts along a given path, reciprocating cutting means for severing fur from each pelt, and means separate from said cutting means for directing a constant air blast adjacent said cutting means in a direction opposite to the travel of said pelt for removing severed fur immediately from the range of action of said cutting means.

30. In apparatus for cutting fur from pelts, reciprocating cutting means for severing fur from each pelt, means forward of said cutting means for feeding pelts to said cutting means, and means rearward of said cutting means and separate therefrom for directing a constant air blast downwardly upon each pelt and in a direction opposite to the travel thereof, to remove severed fur immediately from the range of action of said cutting means.

31. In apparatus for cutting fur from pelts, cutting means for severing said fur from said pelts, means comprising a roller for feeding the pelts to said cutting means, said roller comprising a series of axially spaced elements, each having saw-shaped teeth on its periphery, and stripper means cooperating with portions of said roller between said elements for preventing wrapping of the pelt around said roller.

32. In apparatus for cutting fur from pelts, fur severing means comprising a knife element and means for moving said knife across the pelt, and roller means for feeding the pelt along a path transverse to the path of said knife, said roller means comprising axially spaced elements each having saw-shaped teeth on its periphery for preventing the pelt from sidewise movement with respect to its path of travel under the action of said knife.

33. A method of dehairing a pelt comprising feeding a pelt in a given path, repeatedly reciprocating a severing element transversely of said pelt to sever successive portions of fur from said pelt, and directing a concentrated substantially continuous stream of air adjacent said severing element and completely widthwise of the pelt to blow away the severed fur.

34. In apparatus for dehairing pelts, means for feeding a pelt along a given path, knife means positioned transversely to said path and arranged for movement in a plane transverse to said path, and air blast means positioned adjacent said knife means for removing severed fur immediately from the path of said knife means and for maintaining unsevered fur in position to be cut.

ROBERT H. PLASS.